United States Patent
Combee et al.

(10) Patent No.: US 8,072,222 B2
(45) Date of Patent: Dec. 6, 2011

(54) SIGNAL GENERATOR FOR ELECTROMAGNETIC SURVEYING THAT PRODUCES A SIGNAL HAVING AN ANALOG CONTINUOUS WAVEFORM

(75) Inventors: Leendert Combee, Oslo (NO); Michael Malling, Oslo (NO); Phil Heelan, Asker (NO)

(73) Assignee: WesternGeco L. L. C., Houston, TX (US)

( * ) Notice: Subject to any disclaimer, the term of this patent is extended or adjusted under 35 U.S.C. 154(b) by 890 days.

(21) Appl. No.: 12/059,511

(22) Filed: Mar. 31, 2008

(65) Prior Publication Data

US 2009/0243614 A1 Oct. 1, 2009

(51) Int. Cl.
*G01V 3/08* (2006.01)
*G01V 3/12* (2006.01)
(52) U.S. Cl. .......................... 324/365; 324/337; 324/357
(58) Field of Classification Search ................... 324/365, 324/337, 357
See application file for complete search history.

(56) References Cited

U.S. PATENT DOCUMENTS

| | | | | |
|---|---|---|---|---|
| 2,531,088 A * | 11/1950 | Thompson | ..................... | 324/365 |
| 4,298,840 A * | 11/1981 | Bischoff et al. | ............... | 324/365 |
| 5,067,112 A | 11/1991 | Meek et al. | | |
| 7,042,801 B1 | 5/2006 | Berg | | |
| 7,307,424 B2 * | 12/2007 | MacGregor et al. | .......... | 324/337 |
| 7,362,102 B2 * | 4/2008 | Andreis | ........................ | 324/365 |
| 2006/0186889 A1 * | 8/2006 | Andreis | ........................ | 324/345 |
| 2008/0007265 A1 | 1/2008 | Milne et al. | | |

FOREIGN PATENT DOCUMENTS

WO 2004008183 A3 1/2004

OTHER PUBLICATIONS

McMechan, et al., Analysis of Dispersive Wave by Wave Field Transformation, Geophysics, 1981, pp. 869-874, vol. 46.
S.T. Hildebrand, Two Representations of the Fan Filter, Geophysics, 1982, pp. 957-959, vol. 47.
Strobbia, et al., Multi-Offset Phase Analysis of Surface Wave Data (MOPA), Journal of Applied Geophysics, 2006, pp. 300-313, vol. 59, Issue 4.
PCT Search Report, dated Nov. 17, 2009, Application No. PCT/US2009/038677.
International Preliminary Report on Patentability, dated Oct. 14, 2010, Application No. PCT/US2009/038677.

* cited by examiner

*Primary Examiner* — Jay Patidar

(57) ABSTRACT

To perform an electromagnetic (EM) surveying of a subterranean structure, a signal generator produces a signal having an analog continuous waveform without steps in the waveform. Producing the signal is in response to an indication specifying a characteristic of the signal. An antenna is responsive to the signal having the analog continuous waveform to emit an EM field to produce the EM surveying of the subterranean structure.

18 Claims, 4 Drawing Sheets

SIGNAL GENERATOR FOR ELECTROMAGNETIC SURVEYING THAT PRODUCES A SIGNAL HAVING AN ANALOG CONTINUOUS WAVEFORM

TECHNICAL FIELD

The invention relates to providing a signal generator to produce a signal having an analog continuous waveform for use in surveying a subterranean structure.

BACKGROUND

Electromagnetic techniques exist to perform surveys of subterranean structures for identifying layers of interest. Examples of layers of interest in the subterranean structure include subsurface resistive bodies, such as hydrocarbon-bearing reservoirs, gas injection zones, thin carbonate or salt layers, and fresh-water aquifers. One type of electromagnetic (EM) survey technique is the controlled source electromagnetic (CSEM) survey technique, in which an electromagnetic transmitter, called a "source," is used to generate electromagnetic signals. Surveying units, called "receivers," are deployed on a surface (such as at the sea floor or on land) within an area of interest to make measurements from which information about the subterranean structure can be derived. The receivers may include a number of sensing elements for detecting any combination of electric fields, electric currents, and/or magnetic fields.

An EM source produces an EM field by driving a controlled electrical signal that is provided through an electrode of the EM source. The signal produces an EM field that is emitted through an antenna of the EM source.

Traditionally, the electrical signal that is generated by the EM source is a switch-on/switch-off signal, where the electrical signal when in the switched-on state has a relatively large positive current amplitude, and when in the switched-off state, has either a zero or negative current amplitude. Generally, this switched-on/switched-off electrical signal is in the form of a square wave with abrupt steps (step up or step down). However, using a square wave signal to produce EM fields from an EM source limits flexibility and/or accuracy in performing EM surveying of subterranean structures.

SUMMARY

In general, according to an embodiment, a system for performing electromagnetic (EM) surveying of a subterranean structure includes a signal generator to produce a signal having an analog continuous waveform without steps in the waveform. An antenna is responsive to the signals having the analog continuous waveform to emit an EM field to perform the EM surveying of the subterranean structure.

Other or alternative features will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments are possible.

In an electromagnetic (EM) survey arrangement, an EM source according to some embodiments is used that has a signal generator for producing an analog continuous waveform that is provided to an antenna of the EM source. The antenna is responsive to the signal having the analog continuous waveform to emit an EM field to perform EM surveying of a subterranean structure. A signal having an analog continuous waveform refers to a signal that is without steps (step up or step down) in the waveform, as would normally be present in a square waveform (where the square waveform has an "on" state associated with a high positive current amplitude, and an "off" state associated with a low current amplitude, where the low current amplitude is either zero or negative).

The signal having the analog continuous waveform has amplitude levels (current amplitude levels or voltage amplitude levels) that vary substantially continuously over time such that amplitude steps are not present. The change in amplitude levels in the analog continuous waveform occurs over a time duration that corresponds to a frequency range of interest associated with an EM survey operation. This is contrasted to a square wave, where the abrupt step up or step down in amplitudes occur over time durations corresponding to frequencies that are outside the range of interest for performing the EM survey operation. In one example, the frequency range of interest is between 0.1 Hz (Hertz) and 10 Hz.

The use of a signal having an analog continuous waveform enables flexibility in selecting an EM source signal with optimized characteristics. For example, a survey operator can select a frequency (or plural frequencies) that are to be present in the analog continuous waveform signal to achieve a desired goal. Examples of enhanced characteristics include increased energy in a primary signal component (e.g., first harmonic) and/or more optimal spreading of harmonic signals at the desired frequencies.

Figure 1A:
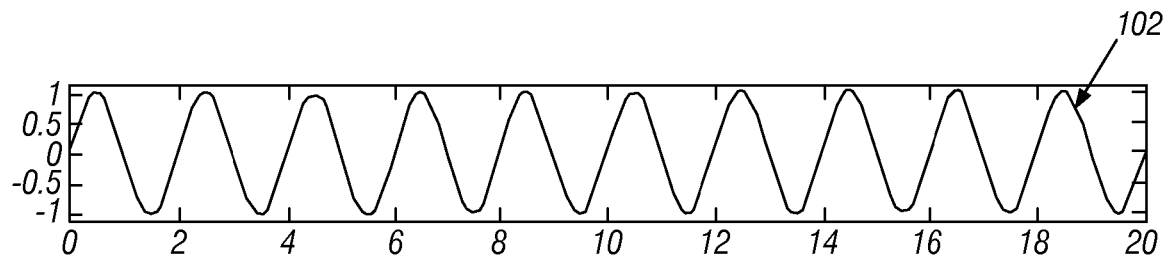
FIGS. 1A-1C illustrate example analog continuous waveforms that are produced at an electromagnetic (EM) source according to an embodiment.

Examples of the signal having an analog continuous waveform include one or more of the following. The signal having an analog continuous waveform can be a simple sine wave signal with a single frequency, such as signal 102 in FIG. 1A. The term "sine wave" refers to either a sine wave or a cosine wave.

Figure 1B:
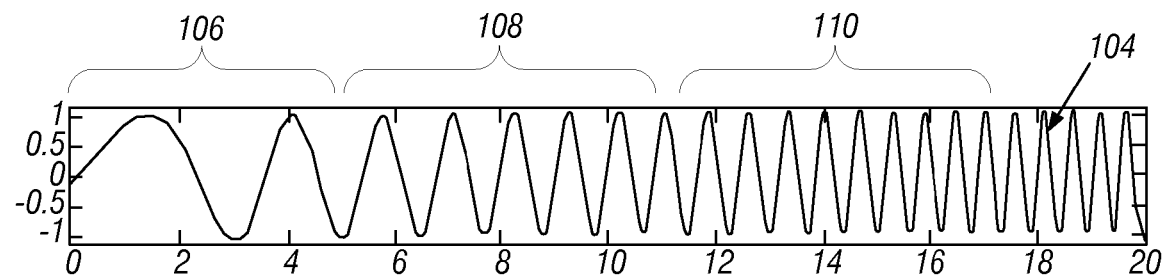

Another example of an analog continuous waveform signal is a sweep signal that has plural sine wave components having plural different frequencies, where the sweep signal is produced by scanning across the plural frequencies. An example of a sweep signal is represented as 104 in FIG. 1B. Note that over time, the frequency of the sweep signal 104 changes (where the changing frequency corresponds to sine wave components having different frequencies). Thus, for example, a first portion 106 of the sweep signal 104 corresponds to a sine wave component at a first frequency, a second portion 108 of the sweep signal 104 corresponds to a sine wave component at a second, larger frequency, a third portion 110 of the sweep signal 104 corresponds to a sine wave component at a third frequency that is larger than the second frequency, and so forth. Basically, the sweep signal 104 is a collection of plural sine wave components at different frequencies, where the plural sine wave components are provided in sequence over time.

Figure 1C:
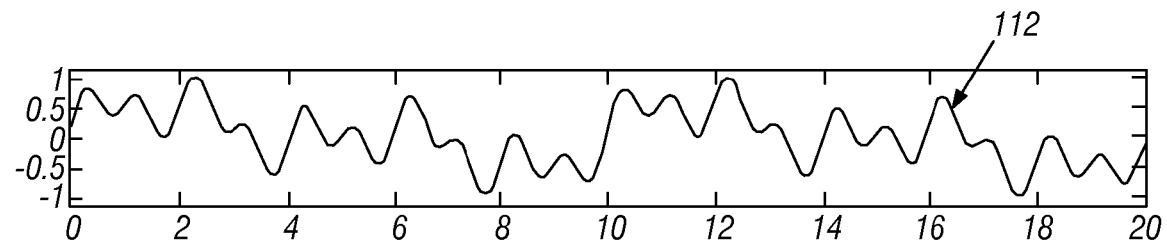

Another example of an analog continuous waveform signal is a composite waveform signal 112 depicted in FIG. 1C, where the composite waveform signal is a superposition of multiple sine wave components at different frequencies. For example, the multiple sine wave components may include sine wave components at 0.1 Hz, 0.2 Hz, 0.5 Hz, and 1 Hz. In other examples, sine wave components at other frequencies can be used to provide the composite waveform signal.

EM surveying performed according to some embodiments with signal generators that produce signals having analog continuous waveforms can be provided in any of a land-based EM survey context, a marine EM survey context, or a wellbore EM survey context.

Figure 2:
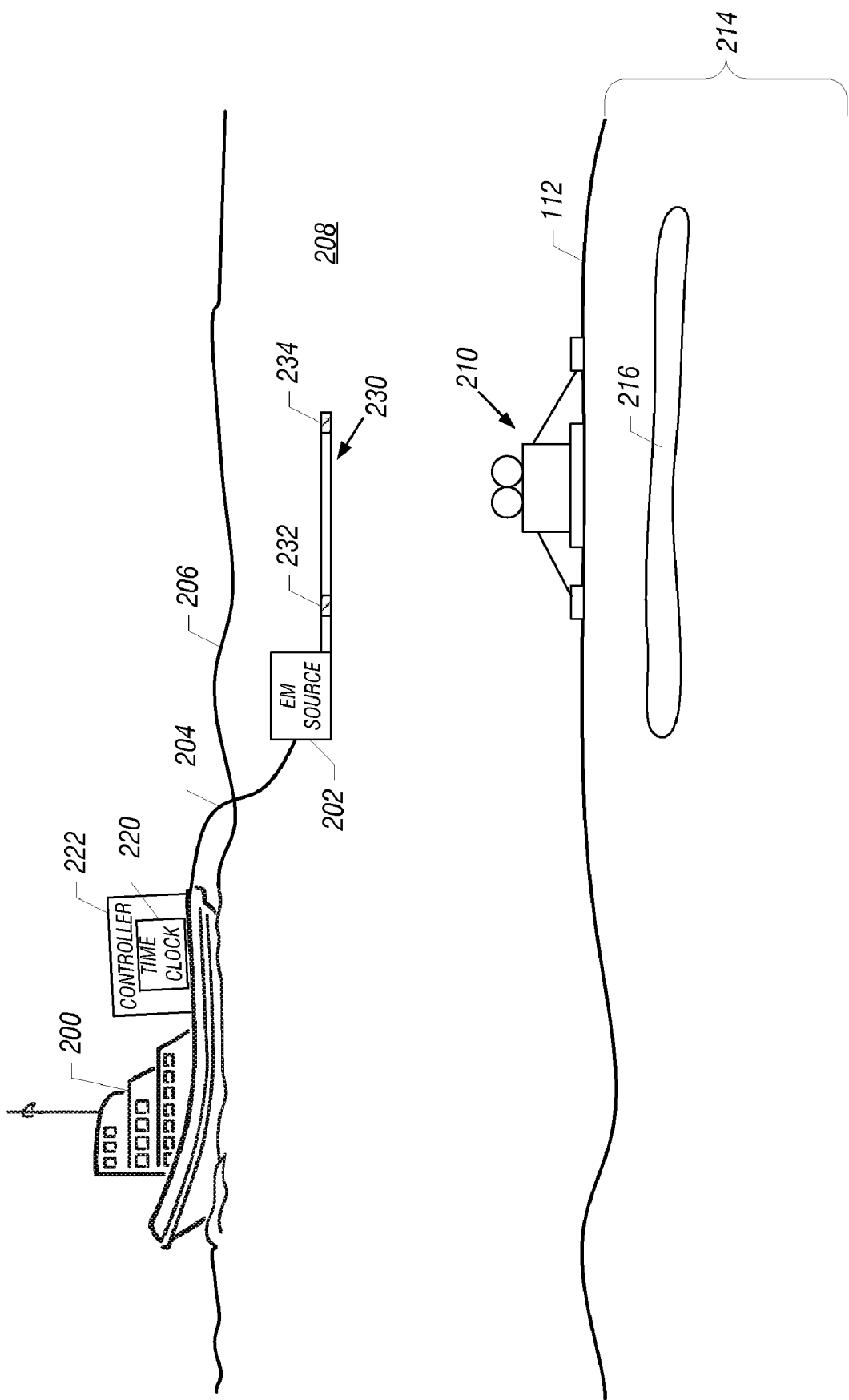
FIG. 2 illustrates an example survey arrangement in a marine environment for surveying a subterranean structure underneath a sea floor.

An example marine survey arrangement is depicted in FIG. 2, which includes a marine vessel 200 for towing at least one EM source 202 by a tow cable 204. Although just one EM source 202 is depicted in FIG. 2, it is noted that the marine vessel 200 can alternatively tow multiple EM sources, either on the same tow cable 204 or on multiple tow cables. Moreover, it is also possible that there may be other marine vessels towing other EM source for performing a subterranean survey operation.

The marine vessel 200 is provided at a water surface 206 and the EM source 202 is towed in a body of water 208 underneath the water surface 206. Note that the EM source 102 can include a tow fish for navigating the EM source 202 in the body of water 208. Moreover, as depicted in FIG. 2, an EM receiver 210 is deployed on an earth surface 212 (e.g., sea floor) that is above a subterranean structure 214 to be surveyed. The subterranean structure 214 can include one or more resistive bodies 216 (e.g., hydrocarbon reservoirs, fresh water aquifers, gas injection zones, etc.) that a survey operator wishes to identify or characterize. Although just one EM receiver 210 is depicted in FIG. 2, it is noted that multiple EM receivers (such as a line or an array of EM receivers) can be deployed in the survey arrangement.

A main controller 222 on the marine vessel 200 has a power supply 220 that provides a high-voltage, low-current main power supply signal over an electrical medium in the tow cable 204 to the EM source 202. The EM source converts this high-voltage, low-current power supply signal into an analog continuous waveform signal that is provided to an antenna 230 of the EM source 202. In some embodiments, the antennas 230 can be an electric dipole antenna having electrodes 232 and 234. In other embodiments, other types of antennas can be used, including magnetic dipole antennas or non-dipole antennas.

The EM source 202 emits EM signals that are propagated into the body of water 208 and into the subterranean structure 214. Portions of the EM signals are reflected by the resistive body 216, and the reflected EM signals are detected by the EM receiver 210. Data corresponding to the detected reflected EM signals are stored in the EM receiver 210.

Subsequently, after some amount of time, the EM receiver 210 can be retrieved from the sea floor 212, at which point EM measurements made by the EM receiver 210 can be retrieved from a storage in the EM receiver 210. The retrieved EM measurements are subjected to processing to characterize the subterranean structure 214. Processing can be performed by the main controller 222 or by a remote computer located on a sea platform or on land.

Figure 3:
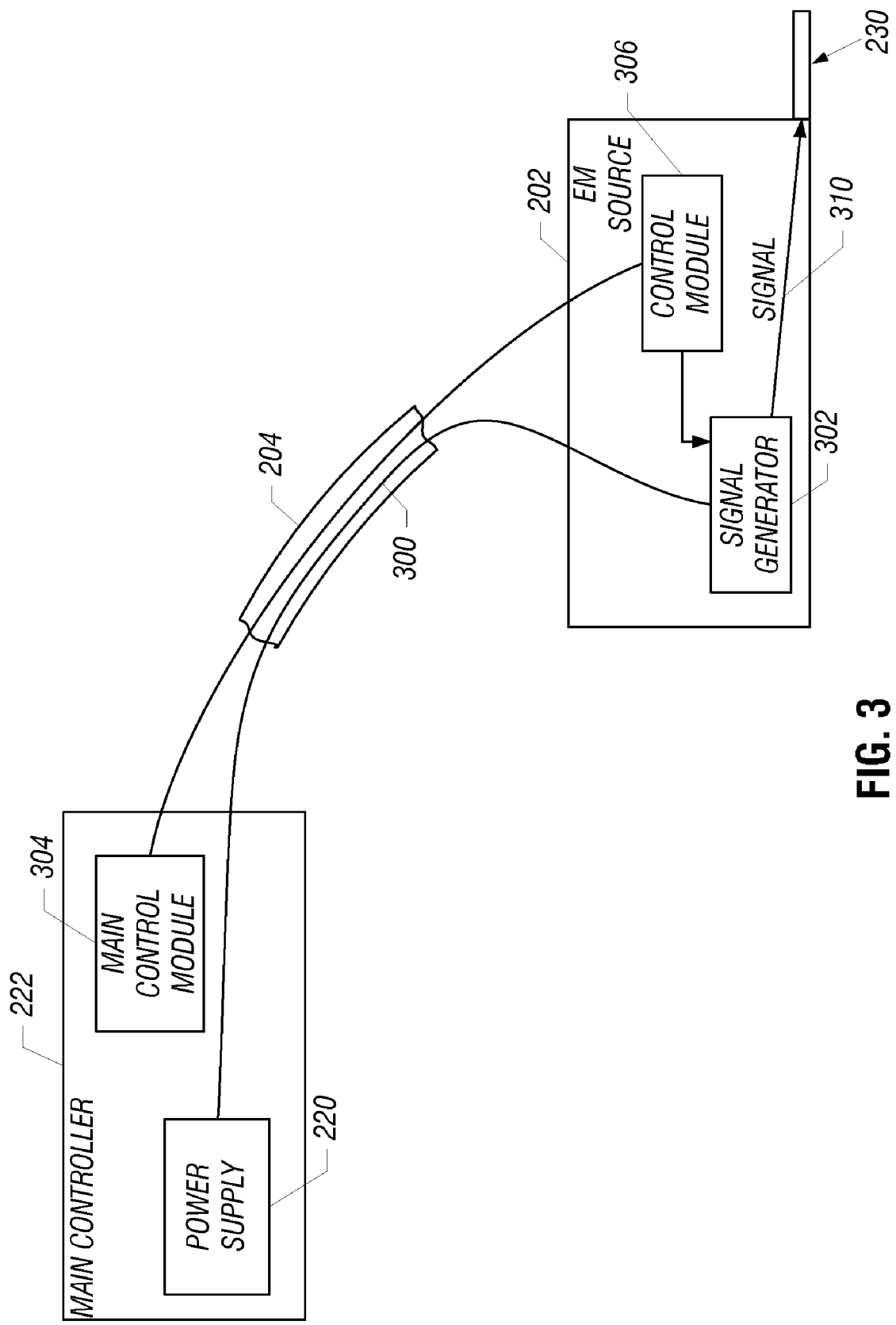
FIG. 3 is a block diagram of components of a main controller and an EM source, according to an embodiment.

FIG. 3 shows components of the main controller 222 and the EM source 202. The main controller 222 has the power supply 220 that supplies a high-voltage, low-current power supply signal over electrical medium 300 (one or more electrical conductors) in the tow cable 204 to a signal generator 302 in the EM source 202. The main controller 222 also has a main control module 304 that is able to communicate with a control module 306 in the EM source 202. For example, the main control module 304 of the main controller 222 can send commands to the source control module 306 regarding when to emit EM fields for performing subterranean surveying. Also, the main control module 304 can send indications to the source control module 306 regarding the desired characteristic of the analog continuous waveform signal to be produced by the signal generator 302. The main control module 304 can command the source control module 306 to produce different analog continuous waveform signals for different survey operations.

In response to the commands/indications received from the main control module 304, the source control module 306 of the EM source 202 controls the signal generator 302 to cause the signal generator 302 to produce an analog continuous waveform signal (310) that is provided to the antenna 230 of the EM source 202. The antenna 230 responds to the analog continuous waveform signal by emitting an EM field propagated toward the subterranean structure to be surveyed.

Figure 4:
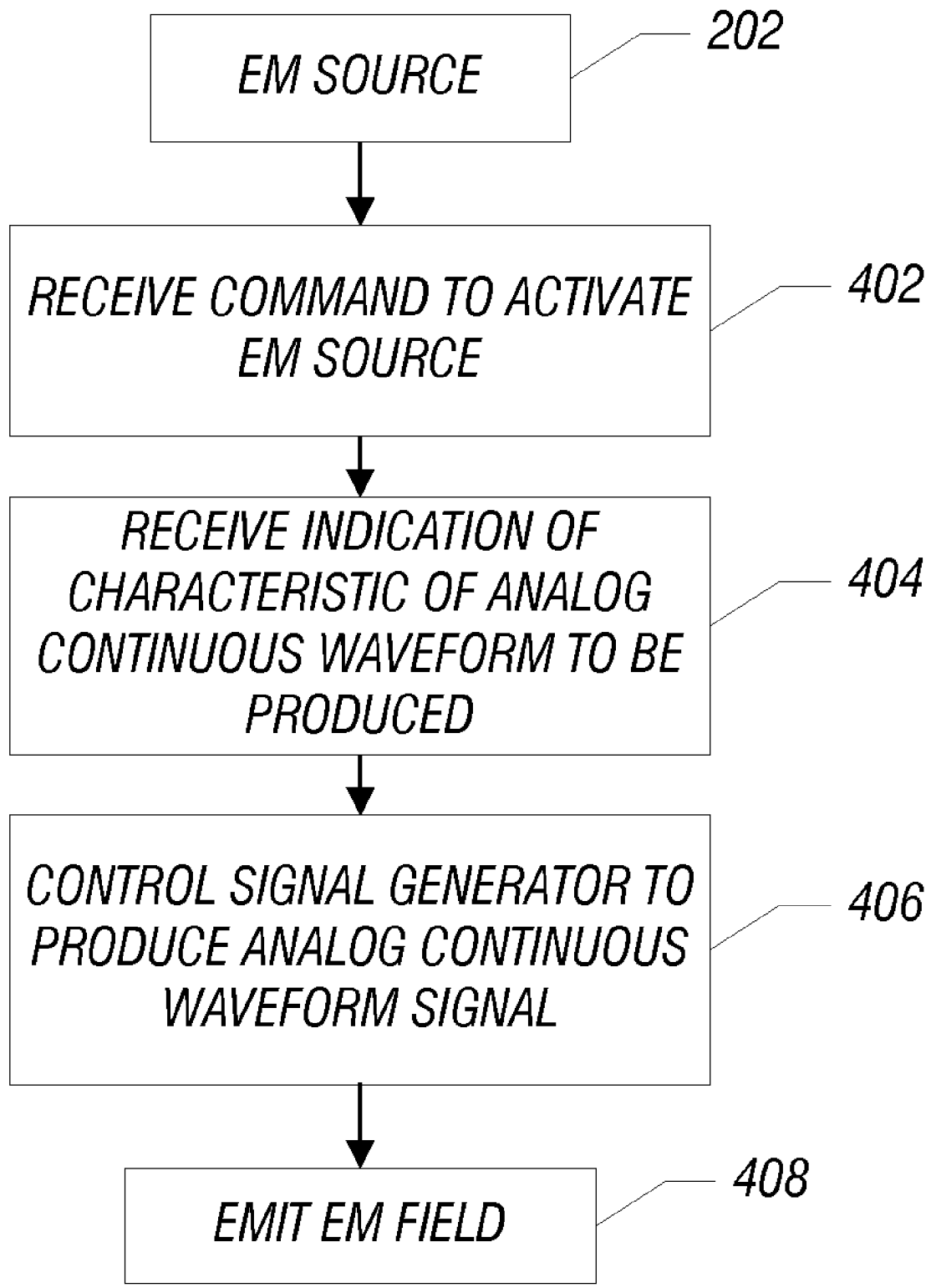
FIG. 4 is a flow diagram of a process of performing surveying in accordance with an embodiment.

FIG. 4 is a flow diagram of a process performed by the EM source 202. The EM source receives (at 402) a command (or multiple commands) to activate the EM source 202. The EM source 202 also receives (at 404) an indication of the characteristic of the analog continuous waveform signal to be produced. For example, the indication can specify that the analog continuous waveform signal is a sine wave having a single frequency, a sweep signal, or a composite signal, as discussed above in connection with FIGS. 1A-1C. The indication can also alternatively specify another type of analog continuous waveform signal. The received indication can be part of the command(s) received at 402, or the indication can be in a separate command(s) received by the control module 306 of the EM source 202 from the main controller 222.

The control module 306 of the EM source 202 then controls (at 406) the signal generator 302 to produce the analog continuous waveform signal according to the requested characteristic specified by the indication at 404. An EM field is then emitted (at 408) by the antenna 230 of the EM source 202 in response to the analog continuous waveform signal.

While the invention has been disclosed with respect to a limited number of embodiments, those skilled in the art, having the benefit of this disclosure, will appreciate numerous modifications and variations therefrom. It is intended that the appended claims cover such modifications and variations as fall within the true spirit and scope of the invention.

What is claimed is:

1. A system for performing electromagnetic (EM) surveying of a subterranean structure, comprising:
   an EM source comprising:
   a signal generator to produce a signal having an analog continuous waveform without steps in the waveform;
   an antenna responsive to the signal having the analog continuous waveform to emit an EM field to perform the EM surveying of the subterranean structure; and
   a control module that is responsive to one or more commands to produce the signal having the analog continuous waveform, wherein the control module is responsive to an indication that specifies a characteristic of the signal having the analog continuous waveform by controlling the signal generator to produce the signal having the analog continuous waveform according to the specified characteristic.

2. The system of claim 1, wherein the signal produced by the signal generator comprises a sine wave signal.

3. The system of claim 1, wherein the signal produced by the signal generator comprises a sweep signal having plural sine wave components of plural different frequencies, wherein the sweep signal is produced by scanning across the plural frequencies over time.

4. The system of claim 1, wherein the signal produced by the signal generator comprises a composite waveform signal produced from superposition of plural sine wave components at different frequencies.

5. The system of claim 1, further comprising a power supply separate from the EM source, the power supply to provide a power supply signal to the signal generator, and wherein the signal generator is responsive to control of the control module to convert the power supply signal into the signal having the analog continuous waveform.

6. The system of claim 5, further comprising a main controller to provide the one or more commands to the control module of the EM source, wherein the power supply is associated with the main controller.

7. The system of claim 6, further comprising a marine vessel, wherein the main controller and power supply are provided on the marine vessel, and wherein the EM source is for towing in a body of water by the marine vessel.

8. An electromagnetic (EM) source comprising:
a signal generator to produce a signal having an analog continuous waveform without steps in the waveform; and
an antenna responsive to the signal having the analog continuous waveform to emit an EM field to perform EM surveying of a subterranean structure; and
a control module responsive to an indication specifying a characteristic of the signal having the analog continuous waveform, wherein the control module is to control the signal generator to produce the signal having the analog continuous waveform according to the specified characteristic.

9. The EM source of claim 8, wherein the signal produced by the signal generator comprises a sine wave signal.

10. The EM source of claim 8, wherein the signal produced by the signal generator comprises a sweep signal having plural components of plural different frequencies, wherein the sweep signal is produced by scanning across the plural frequencies over time.

11. The EM source of claim 8, wherein the signal produced by the signal generator comprises a composite waveform signal produced from superposition of plural sine wave components at different frequencies.

12. The EM source of claim 8, wherein the antenna comprises an electric dipole antenna.

13. A method of performing electromagnetic (EM) surveying of a subterranean structure, comprising:
transmitting one or more commands to an EM source, wherein the one or more commands are associated with an indication that specifies a characteristic of a signal having an analog continuous waveform to be produced in the EM source;
in response to the indication, a signal generator in the EM source producing the signal having the analog continuous waveform, wherein the signal having the analog continuous waveform is without steps in the waveform; and
in response to the signal having the analog continuous waveform, an antenna of the EM source emitting an EM field to perform the EM surveying of the subterranean structure.

14. The method of claim 13, further comprising detecting EM fields reflected from a subterranean structure at an EM receiver, wherein the reflected EM fields are responsive to the EM field produced by the antenna of the EM source.

15. The method of claim 14, further comprising processing measurements made by the EM receiver to characterize the subterranean structure.

16. The method of claim 13, wherein producing the signal having the analog continuous waveform comprises producing a sine wave signal.

17. The method of claim 13, wherein producing the signal having the analog continuous waveform comprises producing a sweep signal having plural components of plural different frequencies, where the sweep signal is produced by scanning across the plural frequencies over time.

18. The method of claim 13, wherein producing the signal having the analog continuous waveform comprises producing a composite waveform signal produced from superposition of plural sine wave components at different frequencies.

* * * * *